United States Patent
Klassen

[11] 3,865,407
[45] Feb. 11, 1975

[54] HITCH PIN

[76] Inventor: James G. Klassen, Rt. No. 1, Lindsay, Nebr. 68644

[22] Filed: Aug. 2, 1973

[21] Appl. No.: 385,107

[52] U.S. Cl. ................................. 280/515, 280/504
[51] Int. Cl. .............................................. B60d 1/02
[58] Field of Search .................... 280/504, 514, 515

[56] References Cited
UNITED STATES PATENTS

| | | | |
|---|---|---|---|
| 2,454,856 | 11/1948 | Bible | 280/515 |
| 2,483,111 | 9/1947 | Spillman | 280/515 |
| 2,835,510 | 5/1958 | Schoneberg | 280/504 |

*Primary Examiner*—M. Henson Wood, Jr.
*Assistant Examiner*—Reinhard J. Eisenzopf
*Attorney, Agent, or Firm*—Zarley, McKee, Thomte & Voorhees

[57] ABSTRACT

A hitch pin comprising an elongated pin element having a head portion adjacent one end thereof and a transverse bore formed therein adjacent the other end thereof. A C-shaped actuator element is pivotally connected at one end thereof to the pin element adjacent the upper end thereof. A spring retainer clip is connected to the other end of the C-shaped actuator element and comprises a shank portion which is adapted to extend through the bore. The clip also comprises an arcuate portion which yieldably embraces the pin element adjacent the bore. An elongated flexible member such as a rope or the like is connected to the actuator element so that longitudinal movement of the flexible member in a upwardly direction will pivotally move the actuator element to cause the clip to be detached from the pin element.

1 Claim, 4 Drawing Figures

PATENTED FEB 11 1975 3,865,407

HITCH PIN

BACKGROUND OF THE INVENTION

Numerous hitch pins have been provided heretofore for connecting the hitch of a trailer or the like to the draw bar of a tractor or the like. Many attempts have been made to provide hitch pins which are easily controlled and which may be remotely operated from the tractor seat. It is highly desirable to be able to remove the hitch pin without leaving the tractor since it is frequently necessary to move the tractor forwardly and rearward slightly to loosen the hitch pin.

It is also necessary in hitch pin construction to provide a safe hitch pin which will not inadverntently become removed from the draw bar. Snap pins have been provided for insertion through the lower ends of the hitch pins but means has not been provided for removing the hitch pins without leaving the tractor. additionally, the insertion of the snap clips into the hitch pin is sometimes difficult due to the size of the snap pin and the location thereof.

Therefore, it is a principal object of the invention to provide an improved hitch pin.

A further object of the invention is to provide a hitch pin having means for removing a snap ring therefrom without leaving the tractor.

A further object of the invention is to provide a hitch pin having a snap clip pivotally secured to an actuator element which is pivotally secured to the upper end of the hitch pin.

A further object of the invention is to provide a hitch pin including means for facilitating the insertion of the snap clip into the transverse bore at the lower end of the hitch pin.

A further object of the invention is to provide a hitch pin which will not become inadvertently disengaged.

A still further object of the invention is to provide a hitch pin which is economical of manufacture, durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENT

Figure 1:
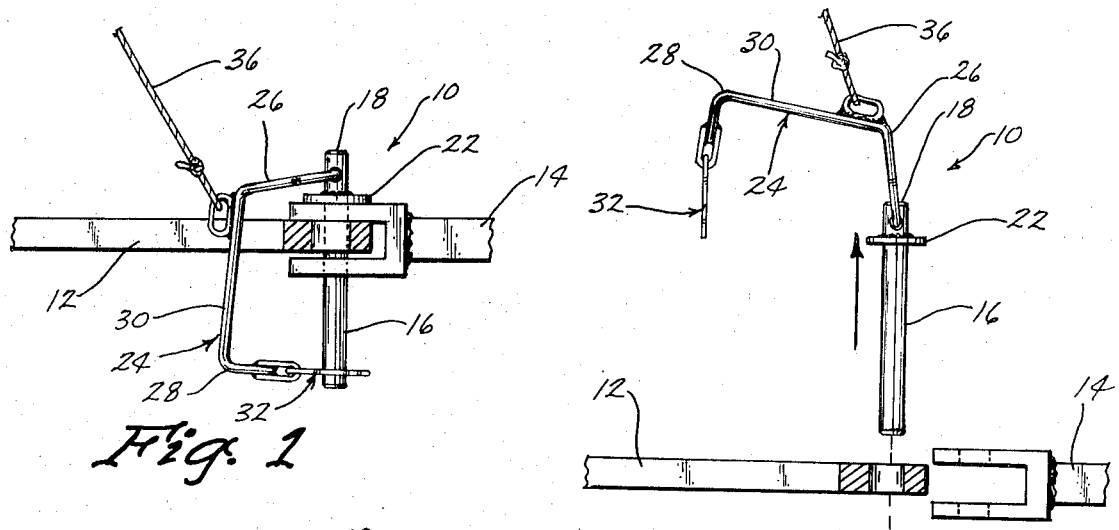
FIG. 1 is a side view of the hitch pin of this invention extending through a hitch and draw bar.
Figure 2:
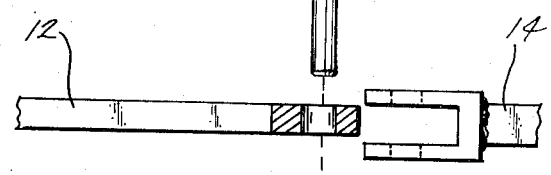
FIG. 2 is a view similar to FIG. 1 except that the actuator element has been pivotally moved upwardly to facilitate the removal of the hitch pin.

The hitch pin of this invention is referred to generally by the reference numeral 10 and is adapted to be inserted through the opening in a draw bar 12 and the openings in a tongue on hitch 14 for connecting the same. Hitch pin 10 comprises an elongated pin element 16 having a head portion 18 adjacent its upper end and a transverse bore 20 adjacent its lower end. Plate 22 is secured to pin element 16 below the upper end thereof to limit the downward movement of the pin element 16 with respect to the draw bar.

The numeral 24 refers to a generally C-shaped or U-shaped actuator element which is pivotally connected about a horizontal axis at its upper end to the upper end of the pin element 16. For purposes of description, actuator element 24 will be described as comprising leg portions 26 and 28 joined by a base portion 30.

A spring clip 32 is pivotally connected to actuator element 24 as seen in the drawings and comprises a shank portion 33 adapted to be received in bore 20 and an arcuate portion 34 adapted to embrace pin element 16 adjacent bore 20. A flexible member 36 such as a rope, cable or the like is connected at its lower end to actuator element 24 as seen in the drawings.

Figure 3:
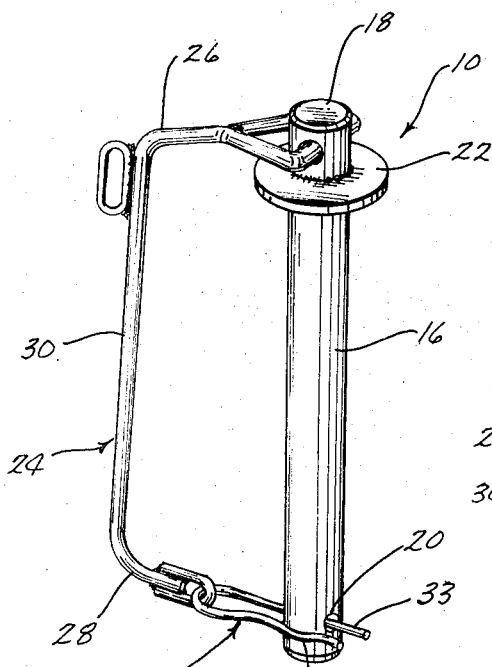
FIG. 3 is a perspective view of the hitch pin.
Figure 4:
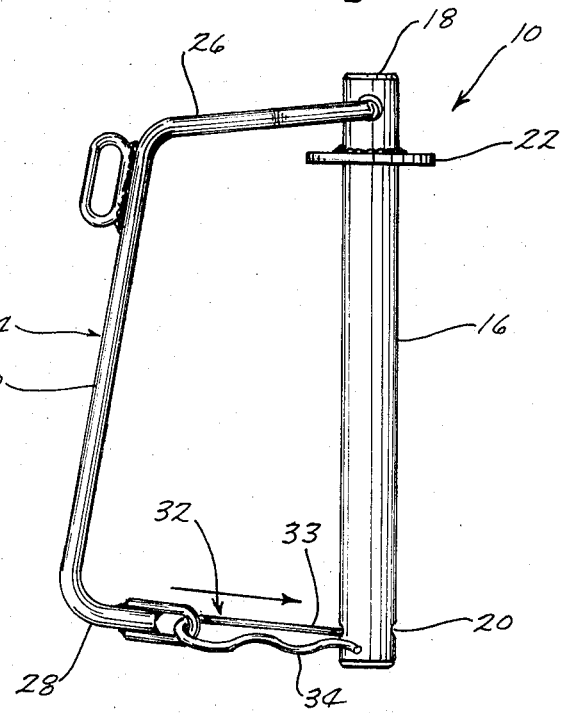
FIG. 4 is a side view of the hitch pin.

Assuming that the hitch pin has previously been removed from the draw bar end hitch, the method of installing the same is as follows. The actuator element 24 is grasped so that the pin element 16 may be extended downwardly through the hitch and draw bar. When the pin 10 has been positioned in the hitch and draw bar, the end of the shank portion 33 is partially inserted into the bore 20 such as illustrated in FIG. 4. The actuator 24 is then forcibly moved in the direction indicated by the arrow in FIG. 4 which causes the shank portion 33 to be moved inwardly in the bore 20 until the arcuate portion 34 embraces the exterior surface of the pin element 16 as seen in FIG. 3. The actuator element 24 permits leverage to be exerted on the spring clip thereby facilitating the installation of the spring clip in a much easier manner than possible on the conventional hitch pins.

When it is desired to remove the hitch pin from the hitch and draw bar, it is simply necessary to pull the rope 36 upwardly which will cause the spring clip 32 to disengage from the transverse bore 20 to permit the hitch pin 10 to be pulled upwardly from the draw bar and hitch pin without the tractor operator leaving the tractor. Upward movement of the rope 36 causes the actuator element 24 to pivot about the upper end of the pin element 16 to permit the pin to be easily removed from the hitch.

Thus it can be sseen that a novel hitch pin has been provided which may be removed from the hitch and draw bar without the tractor operator leaving the tractor. It can also be seen that a novel hitch pin has been provided which will not become inadvertently disengaged from the hitch and draw bar since the spring clip 32 positively maintains the hitch pin in position until it is desired to remove the same. The hitch pin disclosed herein also permits the spring clip to be easily inserted since leverage may be exerted thereon by the actuator 24. Thus it can be seen that the hitch pin accomplishes at least all of its stated objectives.

I claim:

1. A hitch pin comprising, an elongated pin element having a head portion adjacent one end thereof and a transverse bore formed therein adjacent the other end thereof, a rigid substantially C-shaped actuator element pivotally connected at one end to said pin element adjacent said one end thereof, a spring retainer clip means pivotally connected to the other end of said C-shaped actuator element and comprising a shank portion adapted to extend through said bore, said clip means also comprising an arcuate portion which yieldably engages said pin element adjacent said bore, an elongated flexible member connected at one end to said C-shaped actuator element whereby longitudinal movement of said flexible member in one direction will pivotally move said actuator element to cause said clip means to be detached from said pin element, said actuator element being of said rigid construction to permit said shank portion of said clip means to be inserted into said bore by applying pivotal pressure on said actuator element towards said pin element.

* * * * *